US011001125B2

(12) United States Patent
Goodfellow

(10) Patent No.: US 11,001,125 B2
(45) Date of Patent: May 11, 2021

(54) VEHICLE HVAC SYSTEM INCLUDING COMMON BLOWER FOR FRONT AND REAR AIRFLOW

(71) Applicants: DENSO International America, Inc., Southfield, MI (US); DENSO CORPORATION, Kariya (JP)

(72) Inventor: Jonathon Goodfellow, Macomb, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 222 days.

(21) Appl. No.: 16/285,473

(22) Filed: Feb. 26, 2019

(65) Prior Publication Data

US 2019/0381859 A1   Dec. 19, 2019

Related U.S. Application Data

(60) Provisional application No. 62/685,487, filed on Jun. 15, 2018.

(51) Int. Cl.
*B60H 1/00*   (2006.01)

(52) U.S. Cl.
CPC ..... *B60H 1/00514* (2013.01); *B60H 1/00028* (2013.01); *B60H 1/00428* (2013.01); *B60H 2001/00085* (2013.01); *B60H 2001/00092* (2013.01)

(58) Field of Classification Search
CPC ............ B60H 1/00514; B60H 1/00028; B60H 1/00428; B60H 1/00564; B60H 1/00842; B60H 1/00664; B60H 2001/00085; B60H 2001/00092
USPC .......... 454/142, 121, 127, 155, 333; 165/204
See application file for complete search history.

(56) References Cited

U.S. PATENT DOCUMENTS

| 6,138,749 A * | 10/2000 | Kawai ................ B60H 1/00064 165/204 |
| 6,598,670 B1 * | 7/2003 | Hashimoto ........ B60H 1/00028 165/202 |
| 2016/0236535 A1 * | 8/2016 | Kuwayama ........ B60H 1/00028 |
| 2019/0366794 A1 * | 12/2019 | Agathocleous .... B60H 1/00028 |

\* cited by examiner

*Primary Examiner* — Vivek K Shirsat
(74) *Attorney, Agent, or Firm* — Harness, Dickey & Pierce, P.L.C.

(57) ABSTRACT

An HVAC system for a vehicle. The HVAC system including an evaporator case, a heater case, and a blower case. The heater case is in cooperation with the evaporator case to receive airflow from the evaporator case. The heater case includes a heat source and defines front passenger cabin airflow outlets and rear passenger cabin airflow outlets. The blower case is in fluid communication with the evaporator case and includes a single airflow generator that generates airflow through the evaporator case, through the heater case, and to both the front passenger cabin airflow outlets and the rear passenger cabin airflow outlets.

19 Claims, 4 Drawing Sheets

VEHICLE HVAC SYSTEM INCLUDING COMMON BLOWER FOR FRONT AND REAR AIRFLOW

CROSS-REFERENCE TO RELATED APPLICATION

This application claims the benefit of U.S. Provisional Application No. 62/685,487 filed on Jun. 15, 2018, the entire disclosure of which is incorporated herein by reference.

FIELD

The present disclosure relates to a vehicle heating, ventilation, and air conditioning (HVAC) system including a common blower for front and rear airflow.

BACKGROUND

This section provides background information related to the present disclosure, which is not necessarily prior art.

While existing vehicle heating, ventilation, and air conditioning (HVAC) systems are suitable for their intended use, they are subject to improvement. For example, an HVAC system with increased front warm-up performance and increased energy efficiency would be desirable. The present disclosure advantageously includes a vehicle HVAC system that provides improved front warm-up performance and increased energy efficiency, as well as numerous additional advantages and unexpected results as explained in detail herein and as one skilled in the art will appreciate.

SUMMARY

This section provides a general summary of the disclosure, and is not a comprehensive disclosure of its full scope or all of its features.

An HVAC system for a vehicle. The HVAC system includes an evaporator case, a heater case, and a blower case. The heater case is in cooperation with the evaporator case to receive airflow from the evaporator case. The heater case includes a heat source and defines front passenger cabin airflow outlets and rear passenger cabin airflow outlets. The blower case is in fluid communication with the evaporator case and includes a single airflow generator that generates airflow through the evaporator case, through the heater case, and to both the front passenger cabin airflow outlets and the rear passenger cabin airflow outlets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
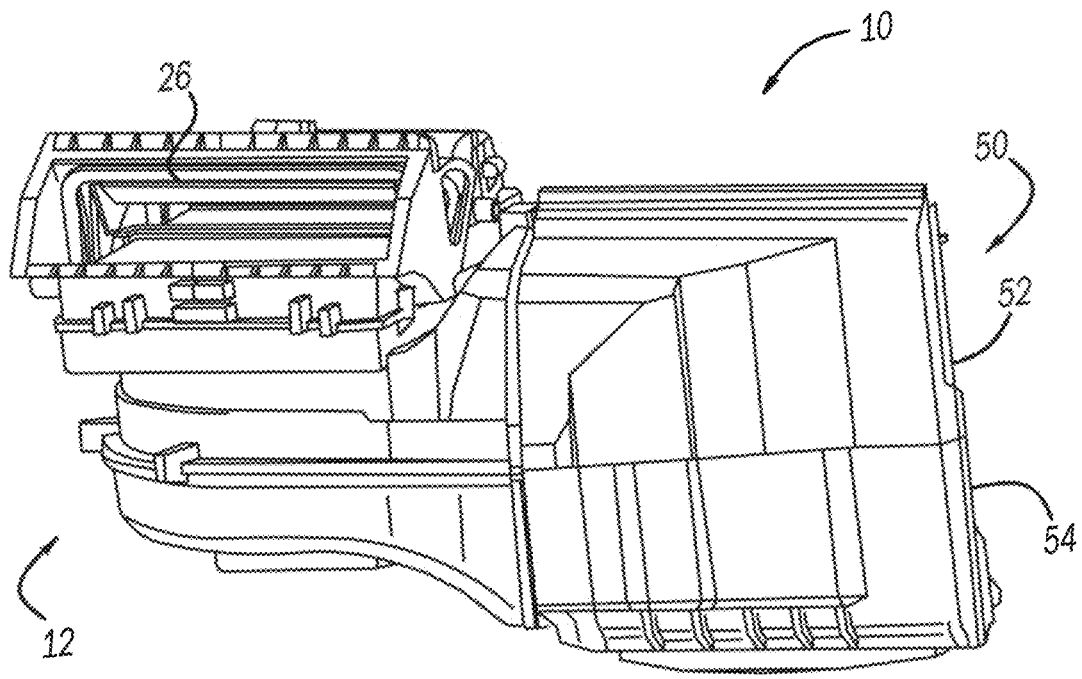
FIG. 1 illustrates a blower and portions of an evaporator case of an HVAC system in accordance with the present disclosure.

FIG. 1 illustrates a heating, ventilation, and air conditioning (HVAC) system 10 in accordance with the present disclosure. The HVAC system 10 may be a vehicle HVAC system, such as described in the examples herein. The HVAC system 10 may be configured for use with any suitable vehicle, such as any suitable passenger vehicle, mass transit vehicle, utility vehicle, commercial vehicle, construction vehicle/equipment, military vehicle/equipment, watercraft, aircraft, etc. The system 10 may also be used with any suitable non-vehicular application as well. The HVAC system 10 generally includes a blower case 12 and an evaporator case 50 having an upper portion (fresh air and/or recirculated air portion) 52 and a lower portion (recirculated air) 54.

Figure 2:
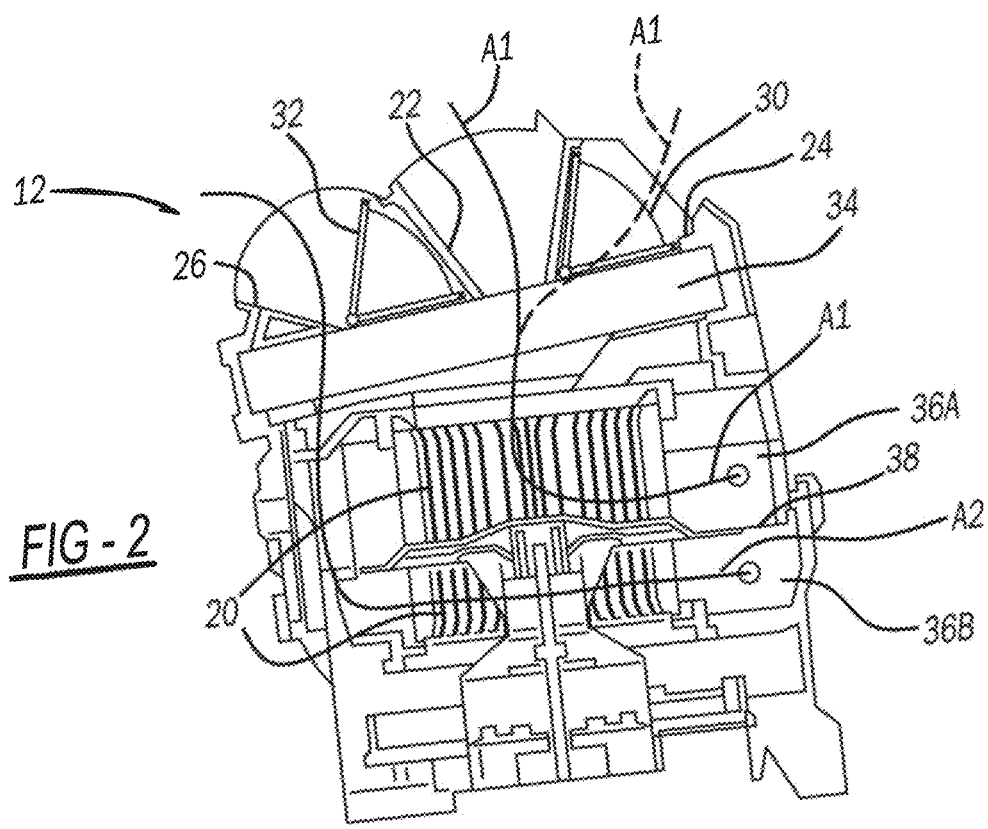
FIG. 2 is a cross-sectional view of the blower of FIG. 1.

With additional reference to FIG. 2, the blower case 12 includes any suitable airflow generating device 20, such as a rotor. The blower case 12 defines a plurality of air inlets, such as a fresh air inlet 22, a first recirculated air inlet 24, and a second recirculated air inlet 26. In the example illustrated, the fresh air inlet 22 is between the first and second recirculated air inlets 24 and 26. The fresh air inlet 22 may be arranged at any other suitable location, however, where fresh air (i.e., air external to the passenger cabin of the vehicle that the HVAC system 10 is installed in) is accessible in order for the rotor 20 to draw fresh air into the passenger cabin of the vehicle that the HVAC system 10 is installed in. Each one of the first and second recirculated air inlets 24 and 26 is arranged at any suitable position within the vehicle to receive recirculated air from the passenger cabin. When activated, the rotor 20 draws air from the passenger cabin into the blower case 12 through the first and second recirculated air inlets 24 and 26. The activated rotor 20 also draws in fresh air through the fresh air inlet 22.

To control airflow into the blower case 12 through the fresh air inlet 22, the first recirculated air inlet 24, and the second recirculated air inlet 26, the blower case 12 further includes a first door 30 and a second door 32. The first and second doors 30 and 32 may be any suitable airflow control doors arranged at any suitable position to control airflow into the blower case 12. In the example illustrated, the first door 30 is a first rotary door movable between the fresh air inlet 22 and the first recirculated air inlet 24. The first door 30 is thus movable to allow airflow into the blower case 12 from only the first recirculated air inlet 24 (and thus bock the fresh air inlet 22), from only the first air inlet 22 (and thus block the first recirculated air inlet 24), or allow airflow into the blower case 12 simultaneously through both the fresh air inlet 22 and the first recirculated air inlet 24 when the first door 30 is moved to an intermediate position. The second door 32 can be any door suitable to control airflow through the second recirculated air inlet 26. For example and as illustrated, the second door 32 is any suitable rotary door movable to open the second recirculated air inlet 26 to any suitable degree, or close the second recirculated air inlet 26.

The blower case 12 includes a first blower outlet 36A and a second blower outlet 36B. In the example illustrated, the first and second blower outlets 36A and 36B are arranged vertically relative to one another, and separated by any suitable wall or other divider 38. Airflow A1 entering the blower case 12 through the fresh air inlet 22 and/or the first recirculated air inlet 24 exits the blower case 12 through the first outlet 36A. Airflow A2 entering the blower case 12 through the second recirculated air inlet 26 exits the blower case 12 through the second outlet 36B. The blower case 12 may further include a filter 34, which filters dust, dirt, and any other undesirable particulates from the air.

Figure 3:
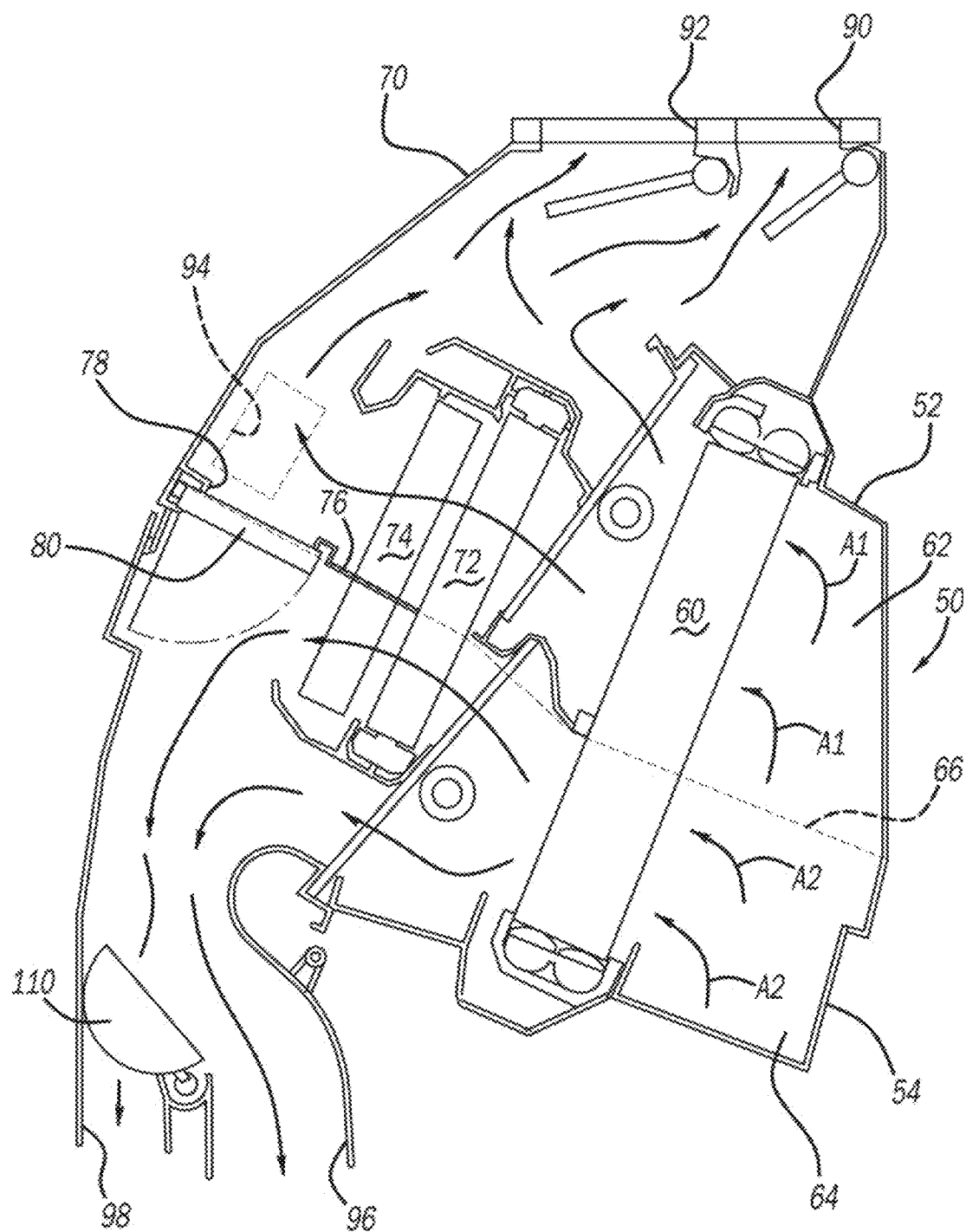
FIG. 3 is a cross-sectional view of the evaporator case and a heater case of the HVAC system in a normal mode.

With additional reference to FIG. 3, the evaporator case 50 defines an upper air inlet 62 at the upper portion 52, and a lower air inlet 64 at the lower portion 54. A divider 66 separates the upper and lower air inlets 62 and 64. The upper air inlet 62 is in fluid cooperation with the first blower outlet 36A such that airflow A1 generated by the rotor 20 enters the evaporator case 50 through the upper air inlet 62. The lower air inlet 64 is in fluid cooperation with the second blower outlet 36B such that airflow A2 generated by the rotor 20 enters the evaporator case 50 through the lower air inlet 64. The evaporator case 50 further includes an evaporator 60, which is arranged in both the upper portion 52 and the lower portion 54 of the evaporator case 50. Thus, airflow A1 entering through the upper air inlet 62 and airflow A2 entering through the lower air inlet 64 flows through, and may be cooled by, the evaporator 60.

The HVAC system 10 further includes a heater case 70, which is in cooperation with the evaporator case 50 to receive airflow A1 and airflow A2 from the evaporator case 50. The heater case 70 includes a heater core 72. The heater case 70 may also include a secondary heat source 74. The secondary heat source 74 may be any suitable heat source, such as another heater core, a heat pump, or a PTC heater. Both the heater core 72 and the secondary heat source 74 extend across a divider 76. The divider 76 is aligned with, or a continuation of, the divider 66. Thus like the divider 66, the divider 76 separates airflow A1 from airflow A2. The divider 76 defines an opening 78, through which airflow A2 may flow through. Airflow through the opening 78 is controlled by a recirculation bypass door 80.

The heater case 70 defines a plurality of outlets, such as the following: front face outlet 90; defrost outlet 92; front foot outlet 94; rear foot outlet 96; and rear face outlet 98. On an upper side of the divider 76 is the front face outlet 90, the defrost outlet 92, and the front foot outlet 94. Airflow A1 from the upper air inlet 62 flows directly to the upper portion of the heater case 70. At a lower portion of the heater case 70, on an opposite side of the divider 76, is the rear foot outlet 96 and the rear face outlet 98. The lower portion of the heater case 70 receives airflow A2 directly from the lower air inlet 64. At the rear foot outlet 96 and the rear face outlet 98 is a rear airflow control door 110, which is movable to control airflow through the rear foot outlet 96 and the rear face outlet 98.

FIG. 3 illustrates a normal mode of the HVAC system 10. In this normal mode, the recirculation bypass door 80 is closed such that airflow A1 (which may be fresh air) does not mix with airflow A2 (which may be recirculated air). Airflow A1 exits the heater case 70 through one or more of the front face outlet 90, the defrost outlet 92, and the front foot outlet 94 based on airflow control doors at each of the outlets 90, 92, and 94. Because the airflow A1 may be fully or partially fresh air, airflow A1 aids with dehumidification of the windshield. Airflow A2 exits the heater case 70 through the rear foot outlet 96 and optionally the rear face outlet 98 based on the position of the rear airflow control door 110.

Figure 4:
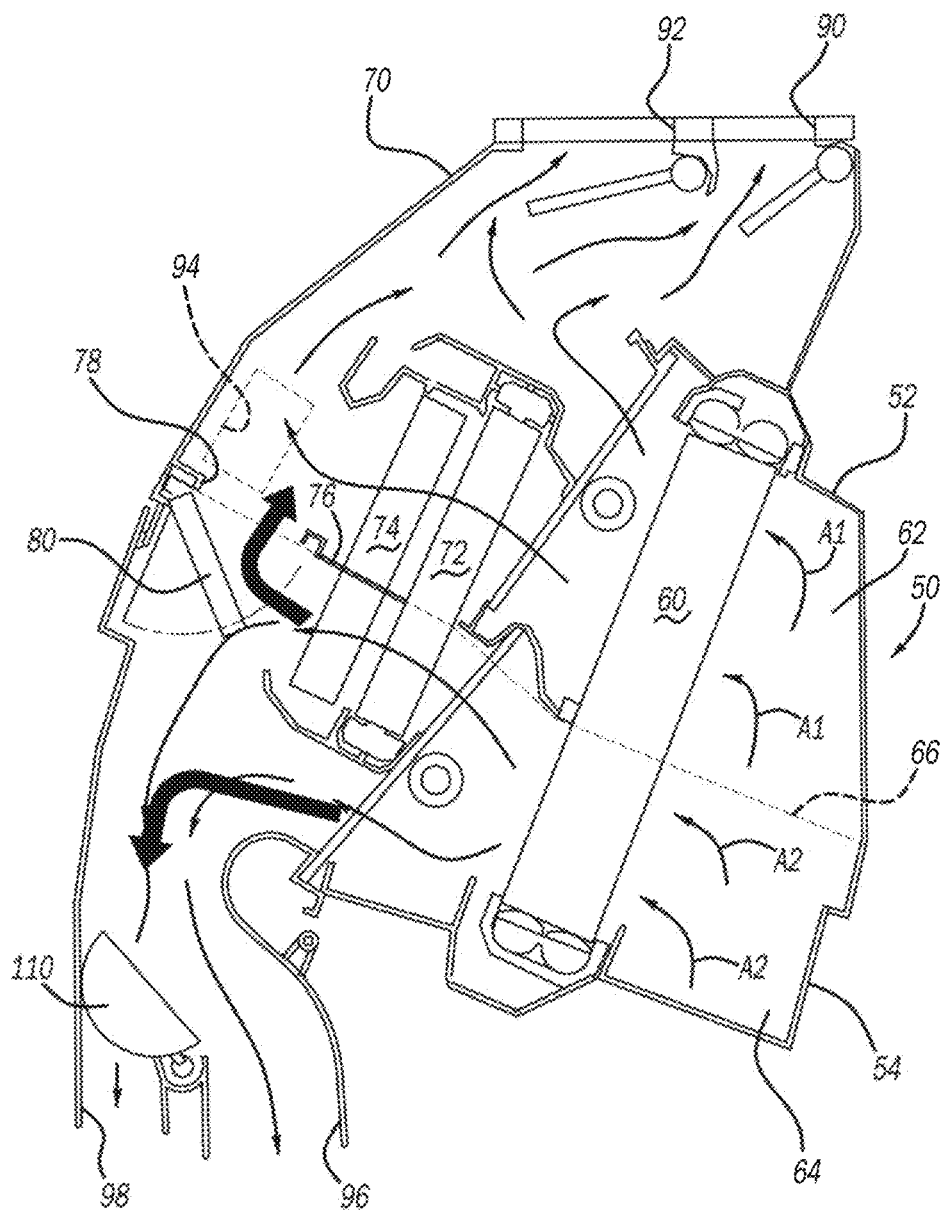
FIG. 4 is a cross-sectional view of the evaporator case and the heater case in an intermediate bypass mode.
Figure 5:
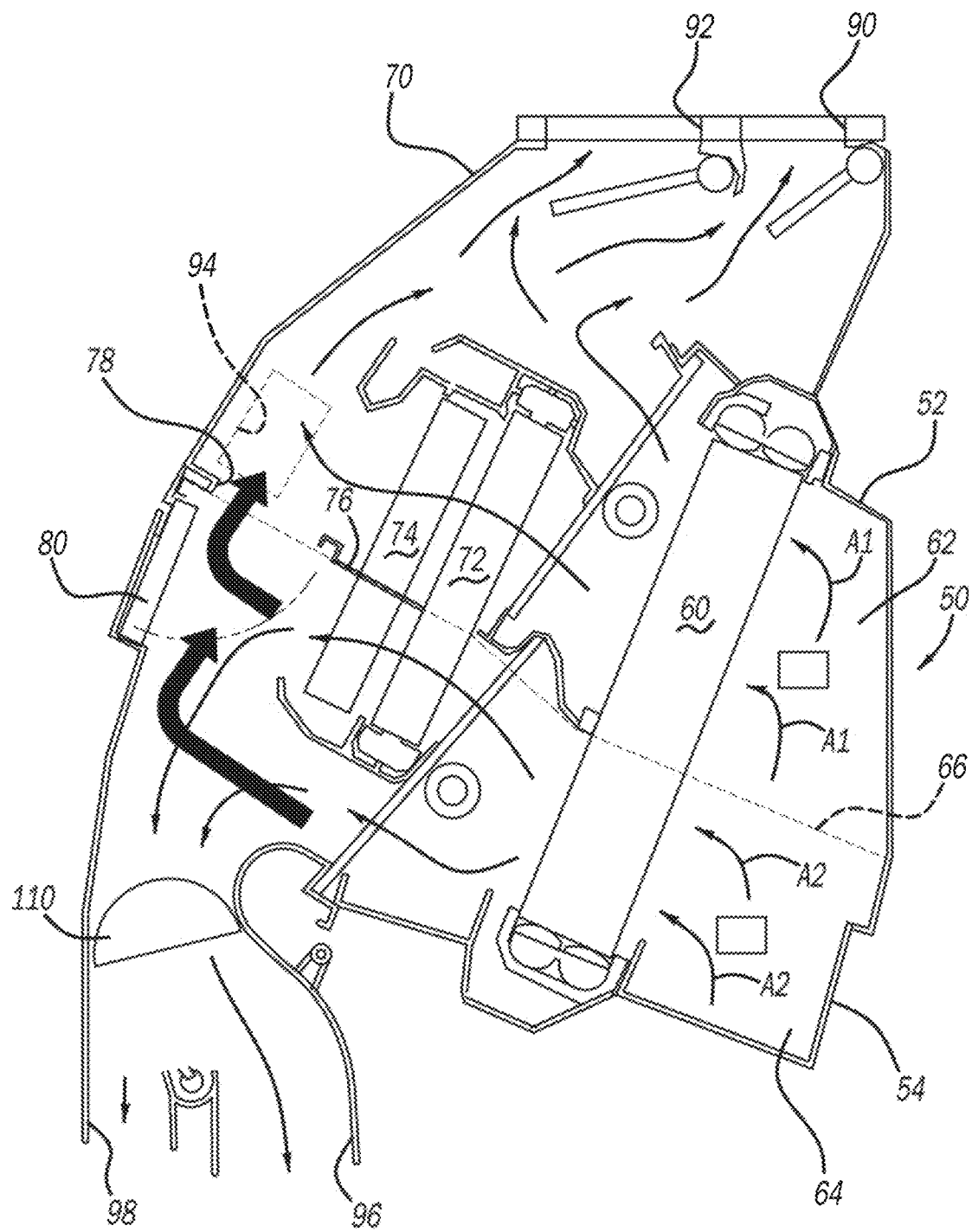
FIG. 5 is a cross-sectional view of the evaporator case and the heater case in a full bypass mode.

FIG. 4 illustrates an intermediate bypass mode of the HVAC system 10. In this intermediate bypass mode, the recirculation bypass door 80 is partially open to allow airflow A2 to flow through the opening 78 and mix with the airflow A1. In this intermediate bypass mode, about 50% of the airflow A2 (which is recirculated airflow) flows through the opening 78 to mix with airflow A1. FIG. 5 illustrates a full bypass mode of the HVAC system 10. In the full bypass mode, the recirculation bypass door 80 is fully open, and the rear airflow control door 110 is fully closed to prevent airflow from flowing through the rear foot outlet 96 and the rear face outlet 98. Thus 100% of the airflow A2 flows through the opening 78 and mixes with airflow A1. The mixture of airflow A1 and A2 flows through one or more of the front face outlet 90, the defrost outlet 92, and the front foot outlet 94 based on the positions of airflow control doors at these outlets.

The present disclosure provides numerous advantages. For example, only a single airflow generator 20 is used to generate airflow A1 and A2. Thus only a single flow generator 20 is necessary for generating front and rear airflow. Previously, multiple airflow generators were required. Thus the present disclosure advantageously provides for a simplified and more efficient HVAC system by eliminating the need for multiple airflow generators.

The HVAC system 10 also advantageously provides increased heating performance as compared to existing systems when in the intermediate bypass mode of FIG. 4 and the full bypass mode of FIG. 5. In these bypass modes, additional airflow in the form of airflow A2 is directed to the front foot outlet 94 (and potentially front face outlet 90 and defrost outlet 92) in order to improve vehicle warmup time and overall efficiency. Because the airflow A2 is recirculated airflow, it may be heated faster and with less energy. This advantageously reduces vehicle warmup time and increases overall efficiency of the HVAC system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system for a vehicle, the HVAC system comprising:
    an evaporator case including an evaporator;
    a heater case in cooperation with the evaporator case to receive airflow from the evaporator case, the heater case including a heat source and defining front passenger cabin airflow outlets and rear passenger cabin airflow outlets; and
    a blower case in fluid communication with the evaporator case, the blower case including a single airflow generator that generates airflow through the evaporator case, through the heater case, and to both the front passenger cabin airflow outlets and the rear passenger cabin airflow outlets;
    a first airflow inlet and a second airflow inlet defined by the evaporator case, the evaporator case is in fluid communication with the blower case such that airflow generated by the airflow generator exiting the blower case enters the evaporator case through the first airflow inlet and the second airflow inlet; and
    an airflow divider separating airflow entering the evaporator case through the first airflow inlet from airflow entering through the second airflow inlet, a portion of the airflow divider extends across the heater case, through the heat source, and defines a bypass opening therethrough.

2. The HVAC system of claim 1, wherein the single airflow generator is a single rotor.

3. The HVAC system of claim 1,
    further comprising a recirculation bypass door at the bypass opening movable to control airflow through the bypass opening.

4. The HVAC system of claim 3, wherein:
    when the recirculation bypass door is closed, airflow entering the evaporator case through the first airflow inlet is directed to the front airflow outlets; and
    when the recirculation bypass door is closed, airflow entering the evaporator case through the second airflow inlet is directed to the rear airflow outlets.

5. The HVAC system of claim 4, wherein:
    when the recirculation bypass door is open, at least a portion of airflow entering the evaporator case through the second airflow inlet is directed to the rear airflow outlets and through the bypass opening to the front airflow outlets.

6. The HVAC system of claim 1, wherein the front airflow outlets of the heater case include a front face outlet, a front foot outlet, and a defrost outlet; and
    the rear airflow outlets include a rear face outlet and a rear foot outlet.

7. The HVAC system of claim 1, wherein:
    the blower case defines a first outlet in fluid communication with the first airflow inlet of the evaporator case; and
    the blower case defines a second outlet in fluid communication with the second airflow inlet of the evaporator case.

8. A heating, ventilation, and air conditioning (HVAC) system for a vehicle, the HVAC system comprising:
    a blower case defining a first outlet and a second outlet;
    an airflow generator within the blower case;
    an evaporator case defining a first airflow inlet and a second airflow inlet, the evaporator case is in cooperation with the blower case such that airflow generated by the airflow generator exiting the first outlet enters the evaporator case through the first airflow inlet, and airflow generated by the airflow generator exiting the second outlet enters the evaporator case through the second airflow inlet;
    a heater case in fluid cooperation with the evaporator case such that airflow through the evaporator case flows through the heater case, the heater case defining front airflow outlets and rear airflow outlets; and
    a divider separating airflow entering the evaporator case through the first airflow inlet from airflow entering through the second airflow inlet, a portion of the airflow divider extends across the heater case, through the heat source, and defines a bypass opening therethrough.

9. The HVAC system of claim 8, wherein the airflow generator is a single airflow generator.

10. The HVAC system of claim 8, wherein the airflow generator is a single rotor.

11. The HVAC system of claim 8, further comprising an evaporator within the evaporator case and a heater core within the heater case.

12. The HVAC system of claim 11, the heater case further including a secondary heat source.

13. The HVAC system of claim 12, wherein the heater core is a primary heater core and the secondary heat source includes at least one of a secondary heater core, a heat pump, and a PTC heater.

14. The HVAC system of claim 8, wherein:
the front airflow outlets of the heater case include a front face outlet, a front foot outlet, and a defrost outlet; and
the rear airflow outlets of the heater case include a rear face outlet and a rear foot outlet.

15. The HVAC system of claim 8, wherein the blower case includes a blower divider separating airflow exiting the first outlet from airflow exiting the second outlet.

16. The HVAC system of claim 8, wherein;
a recirculation bypass door at the bypass opening movable to control airflow through the bypass opening.

17. The HVAC system of claim 16, wherein:
when the recirculation bypass door is closed, airflow entering the evaporator case through the first airflow inlet is directed to the front airflow outlets; and
when the recirculation bypass door is closed, airflow entering the evaporator case through the second airflow inlet is directed to the rear airflow outlets.

18. The HVAC system of claim 16, wherein:
when the recirculation bypass door is open, at least a portion of airflow entering the evaporator case through the second airflow inlet is directed to the rear airflow outlets and through the bypass opening to the front airflow outlets.

19. The HVAC system of claim 8, further comprising a rear airflow control door configured to control airflow through the rear airflow outlets.

* * * * *

UNITED STATES PATENT AND TRADEMARK OFFICE
CERTIFICATE OF CORRECTION

| | | |
|---|---|---|
| PATENT NO. | : 11,001,125 B2 | Page 1 of 1 |
| APPLICATION NO. | : 16/285473 | |
| DATED | : May 11, 2021 | |
| INVENTOR(S) | : Goodfellow | |

It is certified that error appears in the above-identified patent and that said Letters Patent is hereby corrected as shown below:

In the Claims

Column 8, Line 1: Claim 16, delete "wherein;" and insert --wherein-- therefor

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*